US008359211B2

(12) United States Patent
English et al.

(10) Patent No.: US 8,359,211 B2
(45) Date of Patent: Jan. 22, 2013

(54) SYSTEM AND METHOD FOR ACTIVE INSURANCE UNDERWRITING USING INTELLIGENT IP-ADDRESSABLE DEVICES

(75) Inventors: Gary Charles English, West Granby, CT (US); George K. Popadin, Stafford Springs, CT (US); Nicholas A. Zandes, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 150 days.

(21) Appl. No.: 12/942,860

(22) Filed: Nov. 9, 2010

(65) Prior Publication Data

US 2012/0116820 A1 May 10, 2012

(51) Int. Cl.
*G06Q 40/00* (2012.01)
(52) U.S. Cl. ............... 705/4; 370/338; 370/389; 705/40; 705/51; 709/226; 710/302
(58) Field of Classification Search .................. None
See application file for complete search history.

(56) References Cited

U.S. PATENT DOCUMENTS

| | | | | |
|---|---|---|---|---|
| 6,721,297 | B2 * | 4/2004 | Korus et al. .................... | 370/338 |
| 7,941,330 | B1 * | 5/2011 | Buentello et al. ................. | 705/4 |
| 8,041,636 | B1 * | 10/2011 | Hunter et al. .................... | 705/40 |
| 8,209,260 | B2 * | 6/2012 | Kim et al. ........................ | 705/51 |
| 2002/0087364 | A1 * | 7/2002 | Lerner et al. ...................... | 705/4 |
| 2004/0153346 | A1 * | 8/2004 | Grundel et al. ................... | 705/4 |
| 2006/0004939 | A1 * | 1/2006 | Edwards et al. ............. | 710/302 |
| 2006/0106652 | A1 * | 5/2006 | Wamsley .......................... | 705/4 |
| 2009/0116479 | A1 * | 5/2009 | Choi .............................. | 370/389 |
| 2009/0228591 | A1 * | 9/2009 | Mitsunobu et al. ............ | 709/226 |
| 2011/0161117 | A1 * | 6/2011 | Busque et al. .................... | 705/4 |

FOREIGN PATENT DOCUMENTS

WO    WO 95/26536    * 10/1995

OTHER PUBLICATIONS

T. Ernst, C. Castelluccia and H. Lach. Extending Mobile-Ipv6 with Multicast to Support Mobile Networks Ipv6. 8 pages. Motorola Labs, Paris.*
Retrieved Feb. 3, 2011 from http://www.engadget.com/2006/09/11/insurers-starting-to-reimburse-for-digital-content/.
Retrieved Feb. 3, 2011 from http://arstechnica.com/apple/news/2006/09/5246.ars.
Retrieved Feb. 3, 2011 from http://www.independent.co.uk/money/insurance/insurers-get-in-tune-with-the-ipod-generation-415314.html.

* cited by examiner

*Primary Examiner* — Robert R Niquette
(74) *Attorney, Agent, or Firm* — Howard IP Law Group, PC

(57) ABSTRACT

A system and method are disclosed herein for maintaining an inventory of assets located at an insured property covered under an insurance policy based on data received from IP-addressable devices located at the property. The system includes an inventory database for storing inventory information about assets located at an insured property, a communication interface for receiving registration and operational data associated with an IP-addressable device, and a business logic computer. The business logic computer creates a data structure for storing inventory information about assets located at the insured property in the inventory database for each insured property. The business logic computer determines, for the insured property, the inventory information about the insured property's assets based on registration and operational data received from its IP-addressable devices located at the property. The business logic computer stores the insured property's inventory information in its associated data structure in the inventory database.

30 Claims, 9 Drawing Sheets

| Category | Analysis | Underwriting Score |
|---|---|---|
| Home Security and Fire | Is alarm/fire system active? Alarm activated daily? Alarm triggered? | 47 |
| Electrical/General Appliance/Device Computer Stereo | Long period of large electrical usage? Total draw of registered devices? Electrical spikes? | 68 |
| Plumbing Water heater Water meter Refrigerator Washing machine Dishwasher | Long duration of water usage? Amount of devices that are water dependent? (refrigerator, washer, whirlpool, etc.) | 84 |
| Heating/Cooking Oven Toaster Furnace Electrical fireplace | Any space heaters registered? Toaster ovens? Rate of self-clean? | 54 |
| Recalled Appliances | Are there any registered appliance/devices subject to recall? | 81 |
| Other Devices | Tanning booth, power tools | TBD |

FIG. 7

SYSTEM AND METHOD FOR ACTIVE INSURANCE UNDERWRITING USING INTELLIGENT IP-ADDRESSABLE DEVICES

BACKGROUND OF THE INVENTION

Recent and emerging developments in networking protocols and technologies offer unprecedented flexibility, variety, and richness in device interconnectivity and communications for home and commercial enterprises. Devices such as computers, televisions, tools, appliances, water/power/electrical meters can now connect seamlessly to allow data sharing and communication among the devices in both home and business environments and in public settings.

One such technology that allows interconnectivity and communication of devices is Universal Plug and Play (UPnP). UPnP comprises network architecture and protocols for pervasive peer-to-peer network connectivity of devices, such as intelligent appliances, tools, security and fire systems, wireless devices, and other electronic devices. UPnP brings easy-to-use, flexible, standards-based connectivity to ad-hoc or unmanaged networks in various kinds of settings, such as in the home, in a small business, and in public spaces. It is a distributed, open networking architecture that leverages TCP/IP and various web-based technologies and network protocols to enable seamless proximity networking, allowing efficient and real-time data management and communication among networked devices.

Underwriting is the process of determining insurability and premium levels that will economically and profitably transfer risk from a policyholder to an insurance company. In determining insurability and premium, insurance carriers take into account such factors as profit goals, competition, legal restrictions and the costs associated with losses (claims costs), loss adjustment expenses (claim settlements), operational expenses (commission and brokerage fees), general administrative expenses, and the cost of capital. Though UPnP is currently used to inter-connect media devices in a home for home entertainment, capabilities offered by UPnP and/or other technologies for interconnectivity and communication of networked devices are not currently being used by the insurance industry for insurance underwriting or performing other insurance related analysis and activities. Instead, current underwriting practices for residential and commercial buildings are generally based on crude historical data rather than real-time data about the insured property and its assets.

Accordingly, there exists a need for leveraging intelligent networking technologies for obtaining data from IP-addressable devices located at an insured property to determine an insurance policy, identify and mitigate a potential insurance risk, and process claims associated with an insurance loss.

SUMMARY OF THE INVENTION

A "property", as used herein, refers to a building structure and any grounds associated therewith. An "asset", as used herein, refers to goods, fixtures, devices, equipment, and electronic data located at the property.

A system and method are disclosed herein for maintaining an inventory of assets located at a residential or commercial property covered under an insurance policy based on data received from IP-addressable devices located at the property. The system comprises an inventory database, a communication interface, and a business logic computer. The inventory database is configured to store inventory information about assets located at an insured property. The communication interface is configured to communicate with networks of IP-addressable devices for receiving registration and operational data associated with an IP-addressable device connected to each of the networks. The business logic computer can communicate with the database and the communication interface. For each insured property having IP-addressable devices, the business logic computer can create a data structure for storing inventory information about assets located at the insured property in the inventory database. The business logic computer can determine, for the insured property, the inventory information about the insured property's assets based on registration and operational data received from the IP-addressable devices located at the property. The business logic computer can then store the insured property's inventory information in its associated data structure in the inventory database.

An insured property's assets may include physical assets and electronic data stored in the assets. Physical assets may include IP-addressable devices located at the insured property. Based on the registration and operational data received from the IP-addressable devices, the business logic computer can determine presence of the assets located at the insured property. In some embodiments, the business logic computer can detect that an asset is added to or removed from the insured property. The business logic computer can update the inventory information stored in the inventory database in response to the detection. The business logic computer can determine insurance risks and an insurance policy adjustment based on the registration and operational data received from an insured property's IP-addressable devices. In certain embodiments, to determine an insurance policy adjustment, the business logic computer categorizes an insured property's assets into one of a plurality of actuarial classes. Based on each asset's assigned actuarial class, the business logic computer determines an underwriting score for the device and also an aggregate underwriting score for all the assets located at the insured property. The business logic computer determines an insurance policy adjustment based on the aggregate underwriting score associated with the insured property.

BRIEF DESCRIPTION OF THE FIGURES

The methods and systems may be better understood from the following illustrative description with reference to the following drawings in which:

FIG. 7 depicts a table of underwriting scores associated with categories to which a plurality of IP-addressable devices are assigned for determining an insurance policy premium, according to an illustrative embodiment of the invention;

DETAILED DESCRIPTION

Figure 1:
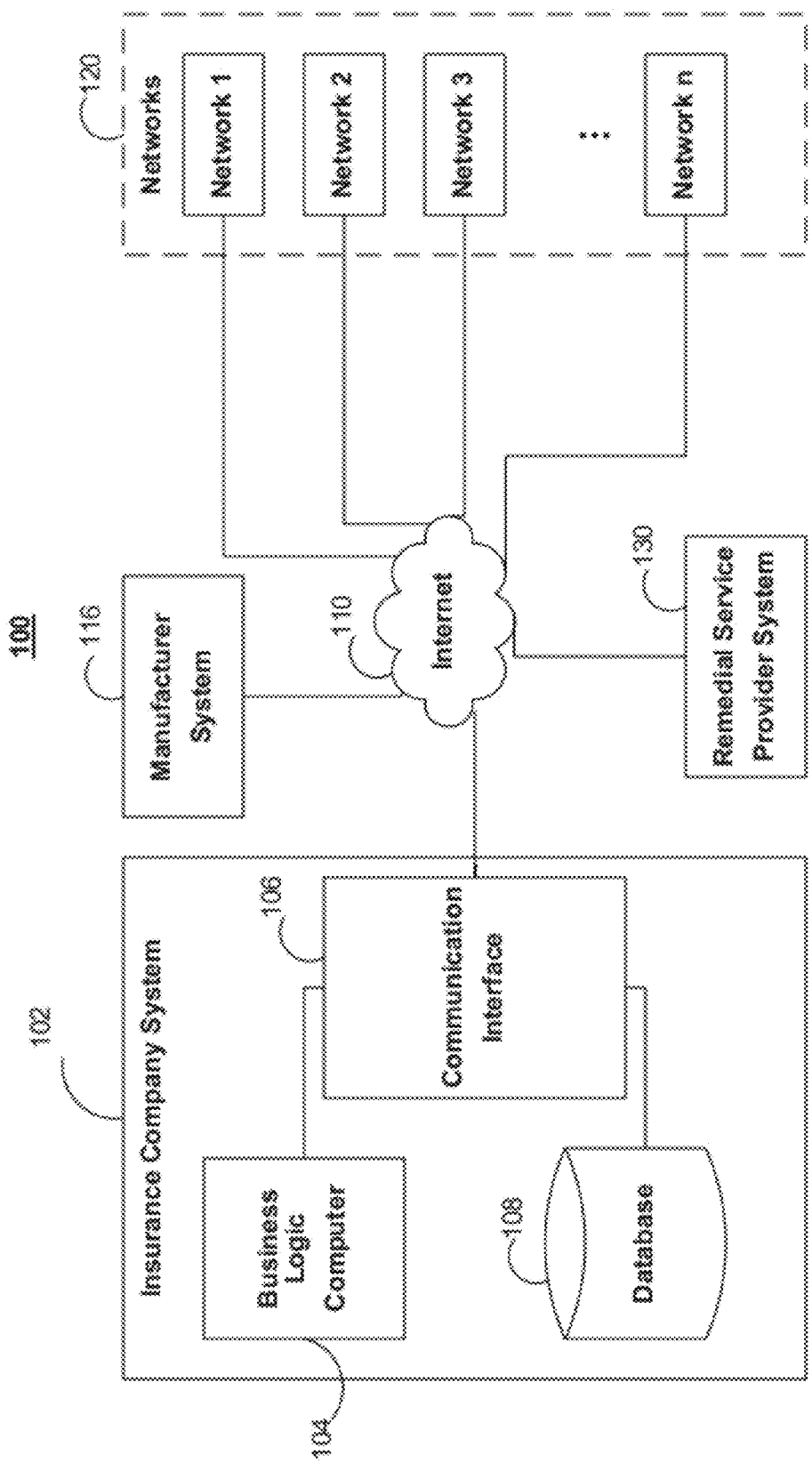
FIG. 1 is a block diagram of an active underwriting system for processing insurance-related data obtained from networks of IP-addressable devices, according to an illustrative embodiment of the invention.

To provide an overall understanding of the invention, certain illustrative embodiments will now be described, including a system and a method for collecting, managing, and analyzing device data received from IP-addressable devices located at an insured property for making various insurance related determinations related to the insured property and its assets.

A number of technologies/protocols may be used alone, or in combination with one another, to enable devices with IP addressing capability to connect to a network from which device data is communicated to an insurance company's network for performing advanced intelligent underwriting discussed below. Such technologies include, without limitations, Zero Configuration Networking, UPnP, Jini, JXTA, and X10. Zero Configuration Networking, or Zeroconf, is a technology developed by Apple Computer built upon multicast DNS and DNS Service Discovery. By using Zeroconf, users without technical expertise in networking engineering can connect devices to a network, as Zeroconf supports automatic assignment of network addresses and device configuration.

As described in the background section, the Universal Plug and Play (UPnP) technology allows seamless interconnectivity of standalone devices for data sharing and communication among IP-addressable devices without the need for a network expert or system administrator to configure the network and devices connected thereto. UPnP comprises a set of network protocols, such as the Simple Service Discovery Protocol, SSDP, that allow easy addition and removal of devices to and from a network, made possible by UPnP's addressing, device discovery, device description, and event-driven notification capabilities. UPnP additionally allows peer-to-peer networking of devices, such as PCs, home appliances, customer electronic (CE) devices, wireless devices, and/or any other IP-addressable devices. The distributed and open protocol of UPnP supports various communication protocols, such as TCP/IP, User Datagram Protocol (UDP), HTTP, and Simple Object Access Protocol (SOAP) for exchanging structured information in a computer network, typically in the XML format.

Jini is a technology based on the Java platform and supports service discovery, description, invocation and presentation implemented using standard Java based programming languages and platforms. Similar to Jini, JXTA was developed by Sun Microsystems and is a complete middleware infrastructure by which peer-to-peer (P2P) applications based on Java technology can be created. JXTA supports various open protocols for enabling devices connected to a network to interact with one another.

X10 is an industry standard for enabling the control of and communication among electronic devices in home or building automation. In particular, X10 is used as a standard for remotely controlling electronic devices via power lines, telephone lines, Ethernet, radio frequency waves, such as wifi, when the devices in a home or building have been properly wired and configured for automation. The present invention can combine the remote control capability offered by X10 with any of the above-mentioned technologies that support seamless inter-connectivity and networking of IP-addressable devices to allow active control of the devices to mitigate insurance losses that may occur on an insured property.

IP-addressable devices referenced herein refer to any electronic device capable of uniquely identifying or advertising itself to an IP network. The process of obtaining an IP address by an IP-addressable device depends on the particular internet protocols used. With the limited number of IP addresses afforded by the IPv4, IP addressable devices typically form a local area network, LAN, having a base station for routing communication between each IP-addressable device behind the LAN and the internet. Following the IPv4 protocol, only the base station of a LAN is assigned a unique public IP address. Each IP-addressable device connected to the LAN is assigned a unique local IP address according to which a base station can direct communication intended for a device. In an IPv6 network, each IP-addressable device can be assigned with a unique public IP address, which allows the device to communicate with other devices connected to the internet directly, without going through a base station. To better manage the traffic flow between the internet and devices, a base station may preferably be used.

Irrespective of the internet protocol used, the process of obtaining an IP address is similar. Each device is a Dynamic Host Configuration Protocol (DHCP) configured client that requests an IP address from a DHCP server. For an unmanaged ad-hoc network in a home or an office building, a DHCP server can also assign an IP address according to the automatic allocation method because a network administrator is not required. DHCP servers used in a network for allocating IP addresses of IP-addressable devices include a router, a switch, a hub, a network appliance, and/or any computing device designated as the gateway to the internet. In an IPv6 network, IP addressable devices, or hosts, can also configure themselves automatically through the stateless address auto-configuration (SLAAC) offered by the IPv6 protocol.

It is assumed in the following discussion that various combinations of the technologies described above can be used to enable IP-addressable devices to communicate with an insurance company's system via the internet. It is also assumed in the following discussion that the IP-addressable devices may have the IP-addressing capability built-in or, in the case of legacy devices, be provided with the IP-addressing capability by devices and/or software having the IP-addressing capability.

FIG. 1 is a block diagram of an active underwriting system 100 for processing insurance-related data obtained from networks of IP-addressable devices, according to an illustrative embodiment of the invention. The active underwriting system 100 includes an insurance company system 102, networks of IP-addressable devices 120, a remedial service provider system 130, and a manufacturer system 116 in communication with one another via the internet 110. The insurance company system 102 can receive device data from a base station associated with each of the networks 120 according any one of push or pull technology used in a client-server architectural model. The communication interface 106 can periodically pull data from each base station or push data, such as control data for remotely controlling the operation of an IP-addressable device, to the base station. Alternatively or additionally, communicating device data from a base station to the insurance company system 102 is interrupt or event driven. In some embodiments, the insurance company system 102 can communicate with each IP-addressable device directly using IPv6 protocol without going through a base station. In such embodiments, each IP-addressable device is associated with a unique public IP address.

The insurance company system 102 includes a business logic computer 104, a communication interface 106, and a database 108. The business logic computer 104 includes a plurality of severs and computers. The communication interface 106 may include a plurality of interfaces that can communicate with another networked device using the Internet Protocol and/or any other communication protocol.

The manufacturer system(s) 116 are systems associated with various manufacturers of assets and/or IP-addressable devices located at an insured property. In some embodiments, the insurance company system 102 can obtain additional data, such as device specifications, about each asset or IP-addressable device from the device manufacturer that makes the asset or device. In some embodiments, the insurance company system 102 obtains a list of recalled devices from the manufacturer system(s) 116 for determining, at device registration and/or periodically once a device is registered with the insurance company system 102, whether an IP-addressable device or an asset needs to be sent back to the manufacturer for replacement or to a repair shop for fixing a fault identified by the manufacturer and/or a regulatory agency.

The remedial service provider systems 130 are systems associated with service providers, such as a repair shop, or government operated entities, such as a fire station, for responding to insurance losses. The systems include a plurality of servers, clients, communication systems, and/or telematics monitoring systems. The systems 130 can communicate with the insurance company system 102, the networks 120, and/or any systems connected to the internet 110.

Figure 2:
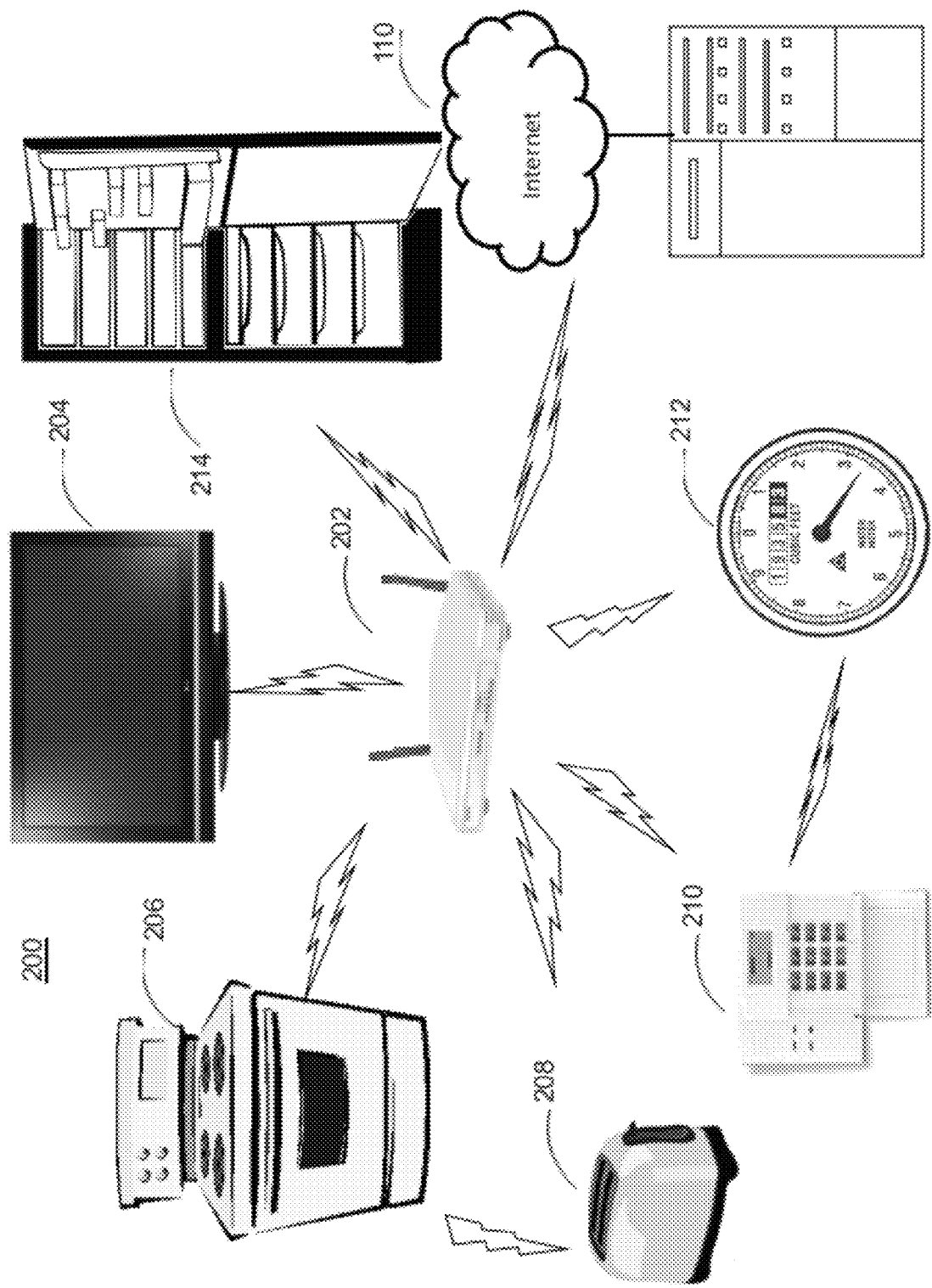
FIG. 2 is a diagram depicting exemplary IP-addressable devices capable of communicating device data to an insurance company system via a local base station, according to an illustrative embodiment of the invention.

The networks 120 include a plurality of networks, local area or wide area networks associated with various properties insured by an insurance company. Located at each property are various assets including IP-addressable devices, such as, for example, an appliance, a computer, a photocopier machine, and a plumbing system. Other illustrative examples of IP-addressable devices are depicted in FIG. 2. The illustrative examples depicted in FIG. 2 include a television 204, a stove 206, electric or gas, a toaster 208, an alarm system 210, a meter 212, such as a water, a gas, or an electric meter, and a refrigerator 214, all equipped with IP-addressing capabilities. Each IP-addressable device can communicate to a base station its device data indicative of the operational, condition, and use of the device. Examples of information that may be contained in the device data of an IP-addressable device are described in relation to FIG. 4. IP-addressable devices may be UPnP enabled and/or RFID enabled. An example of RFID enabled device for outputting device data to a base station or a RFID reader is described in relation to FIG. 9.

Though the illustrative embodiment depicts a home environment, others suitable environments include a small commercial establishment, a large corporate setting, and/or public service areas. Illustrative examples of IP-addressable devices or appliances include:

Home appliances
Lighting and appliance control systems
VoIP and mobile phones
A computer, server, printer, data storage device
Network devices: switch, router, firewall, session border controller
Televisions, gaming systems, DVD players, video recorders e.g., DVR and TIVO
Fiber, cable and DSL modems
HAM Radio Equipment
Surge protectors,
Motor vehicles (personal, recreational, commercial, and marine)
Home mechanicals (same as above)
Manufacturing equipment
Gym equipment
Commercial building mechanicals (boilers, UPS, HVAC, emergency systems, electrical sub-station, switch gear, co-generation and renewable energy generation equipment e.g., solar panels, wind turbines, fuel cells, wave or tide generation; lighting systems and their controllers, and electrical panels)
Security systems, video surveillance, alarm systems, and furnace alarms Each of the IP-addressable devices listed above may be a device with built-in IP-addressing capability or may be a legacy device equipped with an additional IP-addressable device and/or software. For IP-addressable devices with built-in IP-addressing capability, one or more software programs run on electric circuits of the device can determine operational data about the device. In some instances, some IP-addressable devices equipped with self-diagnostics features can determine software errors in its program, which may be associated with unique fault codes. The device can, through its communication or network interface, include the fault codes in its operational message or data to send to the base station 202 for communicating the information to the insurance company system 102. For legacy devices, their peripheral or additional IP-addressable hardware and software components, such as an active RFID tag, need to be physically wired with the devices themselves to obtain device data about the devices.

Referring back to FIG. 1, the insurance company system 102 can use device data of an IP-addressable device to determine the presence of the device and/or another asset located at the property for maintaining an inventory of assets located at an insured property. For example, if an IP-addressable device is an IP-addressable television, device data received from the television may indicate the presence and operation of the television itself. In some instances, the insurance company system 102 can use the device data of one IP-addressable device to determine the presence of other assets connected to the device. For example, the insurance company system 102 can determine, based on the device data about the television, the presence of entertainment devices connected to the television, such as a user set-top box, a DVR, a video game system, and a stereo system.

It is particularly useful for an insurance company to obtain up-to-date inventory information about assets of a property that the insurance company is insuring. This is because certain assets may be added to or removed from a property during an insurance term, which affect the insurance risks associated with the property covered under an insurance policy. Using device data received from an IP-addressable device, the insurance company system 102 can update inventory information stored in its database 108 immediately after a new asset is added to an insured property or after an asset is removed from the property. In some embodiments, as described in relation to FIGS. 5 and 6, the insurance company can determine a policy adjustment based on updated inventory information about the assets located at an insured property. As an example, if an oven with poor safety ratings is replaced with a safer model, by receipt of new registration data for the new oven, the insurance company system 102 may reduce the policy premium, either immediately when the removal of the old oven is detected, upon periodical review of the inventory, or when the insurance policy is up for renewal.

The business logic computer 104 can also use device data to evaluate a claim associated with an insurance loss. For example, after a home fire destroys many assets located at the home, the business logic computer 104 retrieves from the database 108 inventory information associated with the home, which was updated based on device data last received from IP-addressable devices located at the home. Based on the inventory information, the insurance company system 102 can efficiently and accurately determine assets that were destroyed in the fire automatically. This way, the insurance company can also settle claims quicker for policyholders whose involvement in the processing of a claim is also substantially reduced.

As mentioned above, each device can communicate directly with the system 102 without being routed through a base station of a LAN, such as a router, a switch, a hub, a computer used as a network gateway, and/or any other network traffic handling system capable of receiving packets from the internet 110 for delivering packets to their associated destination devices. However, to simplify discussions, it is assumed in the following that each insured property has a local area network to which a plurality of IP-addressable devices are connected for communicating device data to the insurance company system 102. To enable a base station to exchange device and/or control data between IP-addressable devices connected to the base station and the insurance company system 102, certain hardware and/or software components may need to be installed on the base station. For example, a policyholder may download specialized software from the insurance company or a third party service provider via a computer coupled to the internet. The software may be installed on the computer, executing in the background. Alternatively, the policyholder may purchase a base station as a separate hardware appliance configured for polling devices on its local network and forwarding the appropriate device information to the insurance provider or service provider. The base station may have its own IPv6 public IP address, or it may communicate through a router on the policyholder's local network. Depending on the base station, the features or capability of the station may be easily extendable by installing additional firmware and/or other software code. In some instances, modular hardware components, such as those used for configuring a router to allow delivery of Voice data Over IP (VoIP), may be coupled to the base station.

When a base station of a network 120 first establishes communication with the insurance company system 102 after proper network configuration, whether before or after a property associated with the network is insured, the insurance company system 102 receives registration data associated with each IP-addressable device connected to the network. Based on the registration data, the business logic computer 104 of the insurance company system 102 determines, as mentioned above, updated inventory information about assets located at the property. If the property was not previously insured by the insurance company, the business logic computer 104 creates a new data structure in the inventory database 108 for the insured property for tracking inventory information about the property's assets.

In some implementations, the business logic computer 102 can determine an insurance policy premium for a property or an adjustment thereto based on underwriting scores associated with all of the assets in the inventory located at the property. To do so, the database 108 first stores various actuarial classes or categories that the business logic computer 102 can use to determine an appropriate actuarial class for each IP-addressable device and/or inventoried asset located at the property. The business logic computer 104 assigns an underwriting class and category to each device or asset, along with a corresponding underwriting score. To categorize each device and to determine each device's underwriting score, the business logic computer 104 invokes appropriate business logic, in the form of computer executable instructions stored on a computer readable medium, for processing the registration data of the device. After scoring each device and asset, as illustrated in FIG. 7, the business logic computer determines a total underwriting score for all the inventoried assets located at a property. Based on a total underwriting score associated with a property, the business logic computer 104 determines the insurability of the property and appropriate terms for an insurance policy for covering the property, including a policy premium and coverage limit.

If the property is already insured by the insurance company and is recently equipped with IP-addressable devices, the business logic computer 104 can determine a policy adjustment for the property using the underwriting logic. In some embodiments, the business logic computer 104 determines an adjustment in response to detecting that the inventory information indicated in the registration data differs substantially from the inventory information already stored in the database 108 about the property, which was submitted by a policyholder or his/her insurance agent.

Once a property is insured by the insurance company and the system 102 is configured to receive device data from the IP-addressable devices located at the property, the insurance company system 102 periodically receives operational data from the network, which may also trigger an update to inventory information and/or an insurance policy adjustment. Operational data is indicative of the operational status, condition, and/or the use of the device and/or another asset located at the property. In some instances, the operational data of a device may indicate the failure or malfunction of the device. The business logic computer 104 may determine, after receiving the data by the communication interface 106, that the device has been removed from an insured property. Accordingly, the business logic computer 104 updates the data structure associated with inventory information about assets located at the insured property to reflect the inventory change indicated in the operational data.

In some embodiments, for each local area network, a base station aggregates operational data received from each IP-addressable device connected to a network and sends network packets containing the operation data to the insurance company system 102 upon request, periodically, or in response to a request from one of the IP-addressable devices. In other embodiments, a third party data aggregator system aggregates device data received from a plurality of networks of IP-addressable devices. The insurance company system 102 can communicate with the third party data aggregator system for receiving device data.

In some instances, the business logic computer 104 requests additional data about an asset from the asset's corresponding manufacturer system 116 (i.e., the system of the manufacturer of the asset) based on the registration data already received about the asset. As mentioned above, the manufacturer system 116 can provide detailed technical specifications about the asset, which the business logic computer 104 can analyze to determine insurance risks associated with the asset. In some instances, introduction of risky asset onto a property may result in the business logic processor 104 applying an immediate surcharge to the policy premium. In other instances, upon detection of a significant risk, the business logic processor 104 executes a notice procedure to notify the policyholder of the risk. Failure to mitigate a predicted risk can trigger the insurance company system 102 to increase the policyholder's premium. If a loss occurs, the business logic computer 104 can further determine if the loss is associated with a predicted risk that a policyholder has failed to mitigate, even though the policyholder has been notified of the risk. In some embodiments, an insurance company may reject a claim arising from such risk coming to fruition. The insurance company system 102 can notify an intended party via mail, email, text messaging, web page alert, telephone call, and/or any other communication methods.

Though only physical loss associated with a device and/or an asset of an insured property is typically covered by an insurance company, an insurance company may also use the present invention to insure electronic data and/or applications stored in a device, such as business data, documents, music, or other electronic media stored in a computer or a mobile application stored on a smart phone. In such embodiments, the device data received by the communication interface 106 may further include additional information about the electronic data stored in the device. In other embodiments, registration information related to electronic data that a policyholder is seeking to cover under an insurance policy is provided by the policyholder via a user interface, such as a web page, instead of from the device itself.

Figure 3:
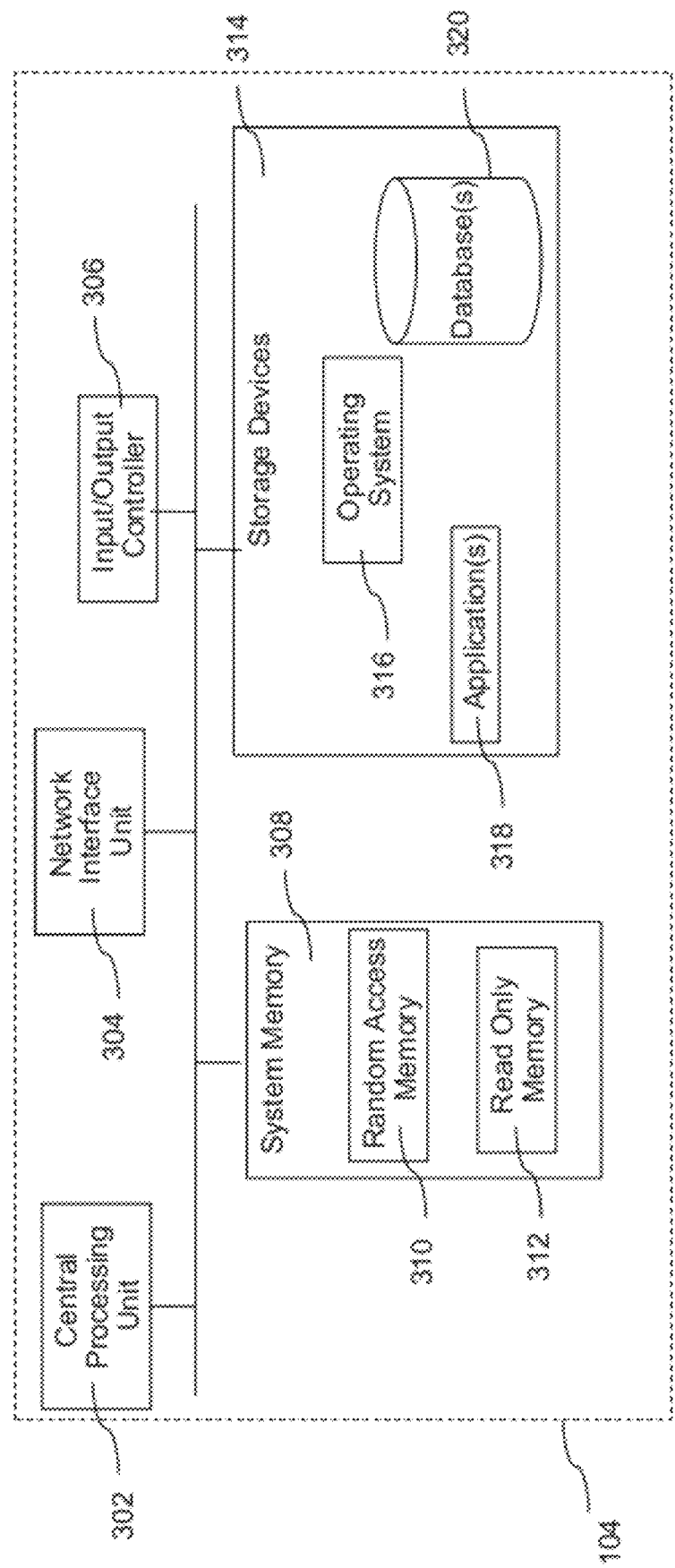
FIG. 3 is a block diagram of the business logic computer used in the active underwriting system as depicted in FIG. 1, according to an illustrative embodiment of the invention.

FIG. 3 is a block diagram of the business logic computer 104 used in the active underwriting system as depicted in FIG. 1, according to an illustrative embodiment of the invention. The business logic computer 104 comprises at least one central processing unit (CPU) 302, system memory 308, which includes at least one random access memory (RAM) 310 and at least one read-only memory (ROM) 312, at least one network interface unit 304, an input/output controller 306, and one or more data storage devices 314. All of these latter elements are in communication with the CPU 302 to facilitate the operation of the business logic computer 104. The business logic computer 104 may be configured in many different ways. For example, the business logic computer 104 may be a conventional standalone computer or alternatively, the function of business logic computer 104 may be distributed across multiple computer systems and architectures. The business logic computer 104 may be linked to other servers or systems housed by the insurance company system 102, such as the communication interface 108

The business logic computer 104 may be configured in a distributed architecture, wherein databases and processors are housed in separate units or locations. The business logic computer 104 may also be seen as a server located either on site near the insurance company system 102, or it may be accessed remotely by the insurance company system 102. Some such units perform primary processing functions and contain, at a minimum, a general controller or a processor 302 and a system memory 308. In such an embodiment, each of these units is attached via the network interface unit 304 to a communications hub or port, such as the communication interface 108, which serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 302 comprises a processor, such as one or more conventional microprocessors and one or more supplementary co-processors such as math co-processors for offloading workload from the CPU 302. The CPU 302 is in communication with the network interface unit 304 and the input/output controller 306, through which the CPU 302 communicates with other devices such as other servers, user terminals, or devices. The network interface unit 304 and/or the input/output controller 306 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 302 is also in communication with the data storage device 314. The data storage device 314 may comprise an appropriate combination of magnetic, optical and/or semiconductor memory, and may include, for example, RAM, ROM, flash drive, an optical disc such as a compact disc and/or a hard disk or drive. The CPU 302 and the data storage device 314 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 302 may be connected to the data storage device 314 via the network interface unit 304.

The data storage device 314 may store, for example, (i) an operating system 316 for the business logic computer 104; (ii) one or more applications 318 (e.g., computer program code and/or a computer program product) adapted to direct the CPU 302 in accordance with the present invention, and particularly in accordance with the processes described in detail with regard to the CPU 302; and/or (iii) database(s) 320 adapted to store information that may be utilized to store information required by the program. In some embodiments, the database(s) 320 includes a database storing logic associated with underwriting of an insurance policy for determining an insurance policy premium for an insurance policy covering an insured property. The database 320 may also store at least a portion of the data stored in the database 108 of FIG. 1 for easier and faster retrieval of frequently accessed data. For example, in addition to storing in the database 108 various actuarial classes or categories used for categorizing the IP-addressable devices located at an insured property, the classes and classification logic can also be stored in the database 320 to allow for faster processing of data obtained from IP-addressable devices by the central processing unit 302.

The operating system 316 and/or applications 318 may be stored, for example, in a compressed, an uncompiled and/or an encrypted format, and may include computer program code. The instructions of the program may be read into a main memory of the processor from a computer-readable medium other than the data storage device 314, such as from the ROM 312 or from the RAM 310. While execution of sequences of instructions in the program causes the processor 302 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions used to process data obtained from a IP-addressable device in accordance with various logic and rules associated with a particular insurance application, the executable instruction for which can also be stored in the storage devices 314. The program also may include program elements such as an operating system, a database management system and "device drivers" that allow the processor to interface with computer peripheral devices (e.g., a video display, a keyboard, a computer mouse, etc.) via the input/output controller 306. The input/output controller 306 can also be configured to communicate directly or indirectly via the communication interface 106 with one or more IP-addressable devices for obtaining device registration and operational data. The input/out controller 306 can further control the IP-addressable devices remotely, similar to a control point implemented on a network for controlling the IP-addressable devices.

The term "computer-readable medium" as used herein refers to any tangible medium that provides or participates in providing instructions to the processor of the computing device (or any other processor of a device described herein) for execution. Such a medium may take many forms, including, but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 302 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electro-magnetic or optical signals, which are exemplary forms of wireless communications or data streams that carry various types of information.

Figure 4:
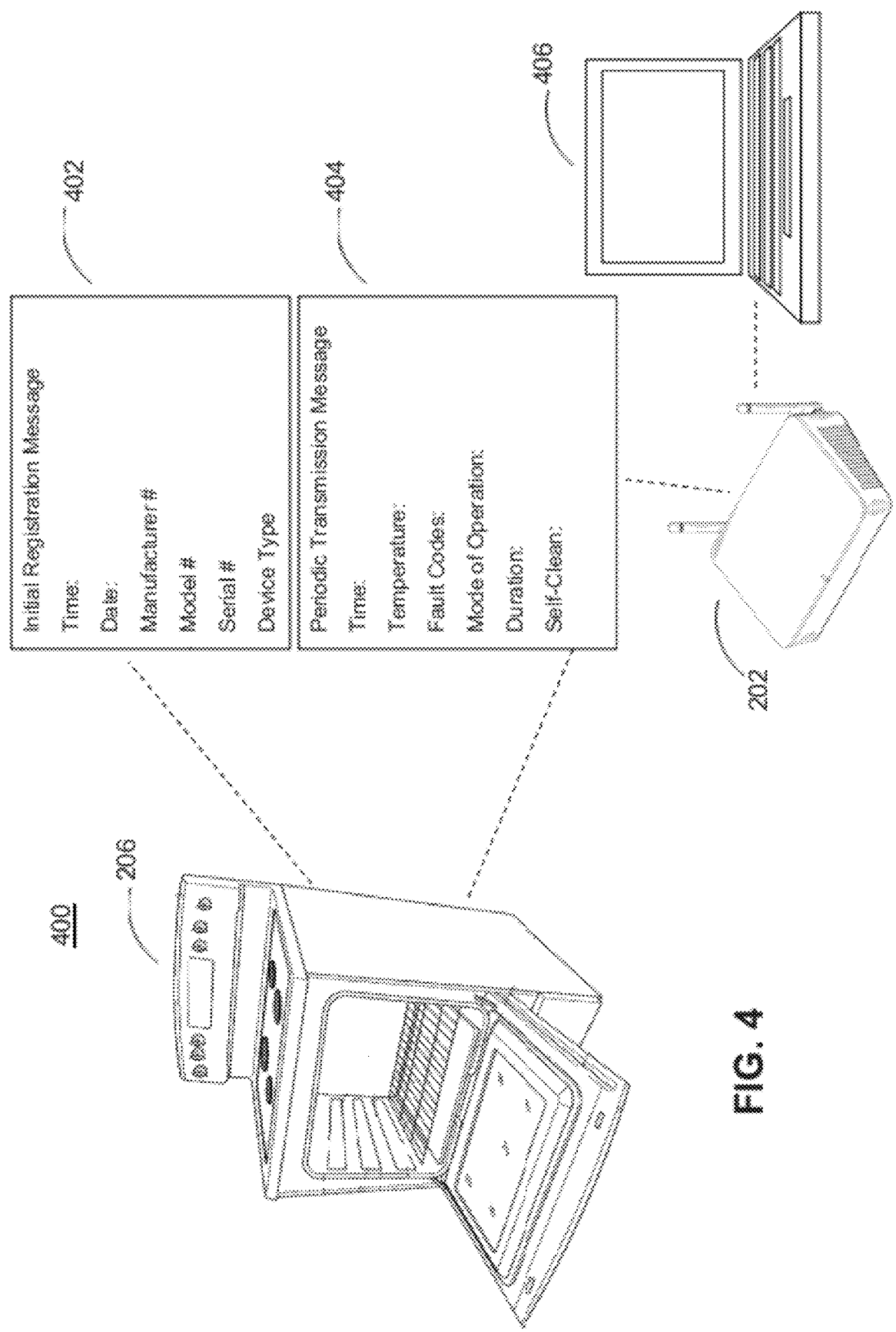
FIG. 4 depicts an exemplary IP-addressable device communicating device data to an insurance company system, according to an illustrative embodiment of the invention.

FIG. 4 depicts an exemplary IP-addressable device communicating device data to an insurance company system, according to an illustrative embodiment of the invention. FIG. 4 depicts the stove 206 and the base station 202 from FIG. 2, and a computer 406 in communication with one another. In particular, the stove 206 can send device data, typically in XML format, to the base station 202. The device data includes a registration message 402 and operational message 406. In some embodiments, the computer 406 stores messages 402 and 406 received from the base station 202 because memory is generally limited on a base station. In other embodiments, the computer 406 is used as a network gateway for communicating device data to the insurance company system 102.

The registration message 402 includes information about the time and date of when the message is generated, a manufacturer identification number, a model number, a serial number, and device type of the stove 306. The registration message 402 may also include information about any embedded devices or services as well as URLs associated with the device. In some instances, an insured property with an appropriate server or network appliance can publish the registration and/or operational messages about its IP addressable devices on a web page. A policyholder and/or insurance company personnel can access device data by viewing the published web page.

Once a device is registered with the insurance company system 102, the stove 206 generates and sends the operational message 404 to the insurance company system 102 periodically or in response to an event trigger. The operational message 404 includes a time stamp indicating when the message is generated, a current temperature of the stove 306, fault codes if faults were detected, the mode of operation, the duration of the operation, and a self-clean report of the stove 306. Depending on the device, information contained in an operational message of one device may substantially differ from another.

Based on the registration message received about a device, the business logic computer 104 may define, for each device, relevant operational information needed from each device. The database 108 stores definitions for each device when a device is first registered with the insurance company system 102. Insurance company system 102 communicates definitions, or rules, for each device to the base station 202 of a network so that only relevant operational information about an IP-addressable device is communicated to the insurance company system 102. An IP-addressable device can automatically configure itself so that only certain kinds of operational information is included in an operational message 404 to the insurance company system 102.

In some embodiments, the stove 206 is a UPnP enabled IP-addressable device. The stove 206 can dynamically join a network, obtain an IP address, announce its name, convey its capabilities upon request, and detect the presence and capabilities of other devices according to the network protocols and architecture associated with UPnP. Once a device joins an UPnP enabled network, the UPnP enabled IP-addressable stove 206 can generate and transmit the depicted registration and operational messages 402 and 404 according to the event notification protocol defined in the UPnP Device Architecture, known as GENA, General Event Notification Architecture. Using this protocol, an UPnP description of changes in variables or states of the stove 206 and/or service may be determined at run time and exported in XML for communication to the insurance company system 102.

In some embodiments, certain IP-addressable devices also include any number of sensors, timers, and computing devices for determining the operational data contained in the message 404. The status or state information indicated by such sensors, timers, computing devices, or internal circuitry, can indicate various device conditions, e.g., a stove is overheated or an alarm system is faulty. The stove 206 can communicate the operational message 404 to the base station 302 via a wireless or wired connection.

Figure 5:
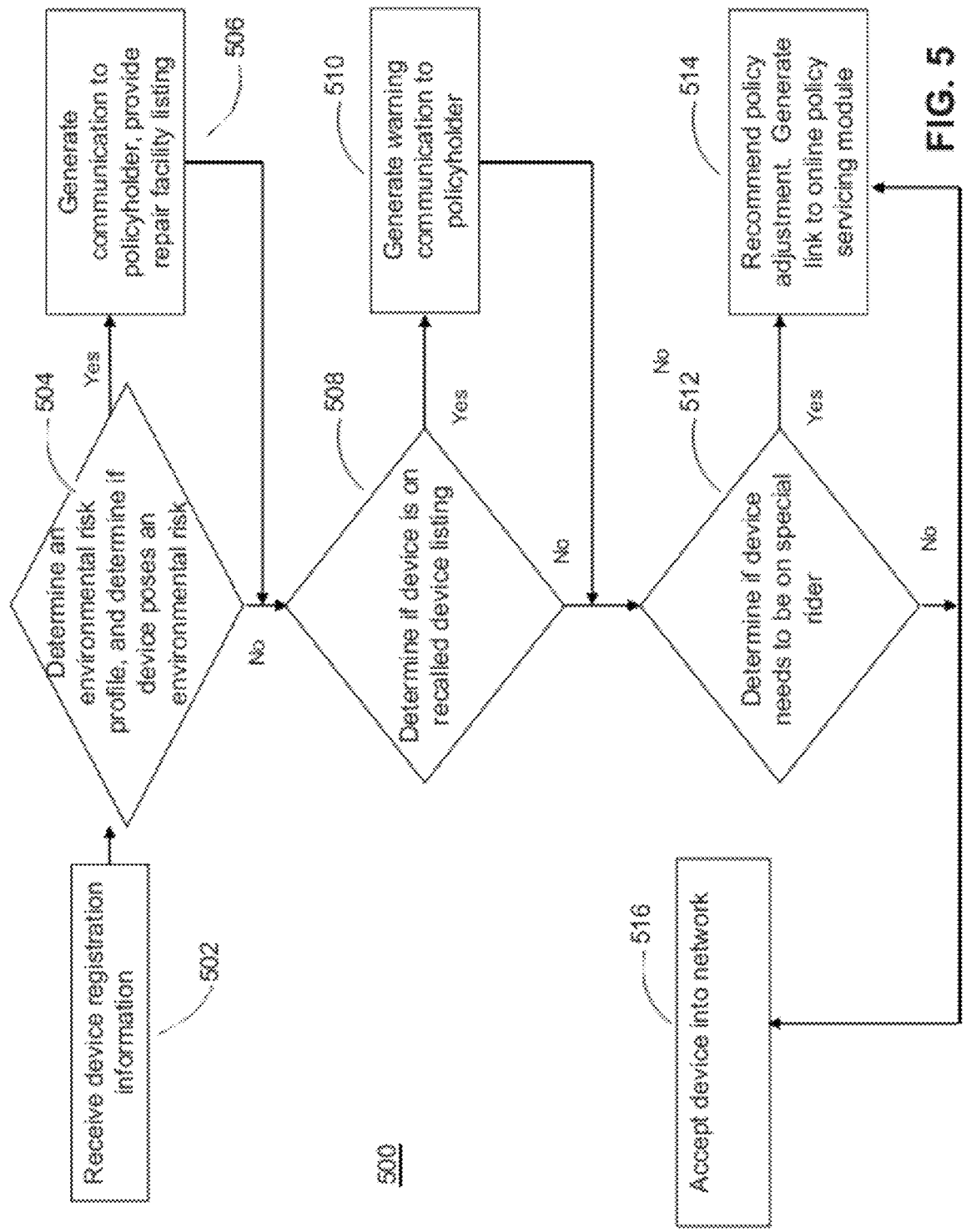
FIG. 5 is a flow chart of a method of processing registration data received from an IP-addressable device recently added to an insured property, according to an illustrative embodiment of the invention.

FIG. 5 is a flow chart of a method 500 of processing registration data received from an IP-addressable device recently added to an insured property, according to an illustrative embodiment of the invention. The method 500 begins at step 502 by first receiving device registration data of an IP-addressable device recently added to an insured property. Based on the registration data, either received from the device directly or from a base station, the business logic computer 104 determines an environmental risk profile for the device at step 504. Also, as part of step 504, the business logic computer 104 additionally determines if a device or an asset(s) that the device is used to monitor poses an environmental risk.

For example, an academic institution may have recently installed in one of its insured buildings an IP-addressable laboratory fume hood designed to mitigate environmental risks, such as risks related to exposure to hazardous or noxious fumes, vapors, or dusts. Though a fume hood is designed to mitigate certain environmental risks, it may also pose environmental risks arising from its use and/or operation. The database 108 may store a list of devices and their associated environmental risk data indicative of risks that the device may pose and/or mitigate. Based on a device's stored environmental data and registration data, the business logic computer 104 can determine the device's overall environmental risk profile including both risks that the hood may mitigate, as well as risks that the hood may pose. If the environmental data associated with a particular device indicates that the device poses certain environmental risks, the business logic computer 104 generates a warning message and communicates a message to a policyholder at step 506.

As described in relation to FIG. 1, many manufacturers, after releasing certain products or goods to market, discover certain faults in their sold products or goods. The manufacturers and/or a regulatory agency may compile and publish a list of such products and goods. By communicating with the manufacturer system 116, the business logic computer 104 determines if a particular device is among the products or goods recalled by its manufacturer, which is useful for risk assessment of the device. If a device is on a recall list, the business logic computer 104 communicates the information to a policyholder and provides the policyholder information about repair facilities at step 510.

After determining whether a device is on a recalled list, the business logic computer 104 determines if the device needs to be on a special rider at step 512. A standard property insurance policy, by default, does not typically cover electronic data loss, antiques, jewelries, and certain other assets. A policyholder can extend his/her property insurance policy to include a rider to cover such assets. The database 108 stores a list of devices or assets that need to be insured under a rider. Based on the registration data associated with a device, the business logic computer 104 determines whether the device is among the list of devices that require a rider, and may automatically add the asset to an existing rider, if it exists.

The business logic computer 104 determines, at step 514, whether a policy adjustment is required or recommended. An adjusted policy may be a new policy for a property that is not currently insured by the insurance company or an adjustment from an existing policy. After determining a policy adjustment, the business logic computer 104 also generates an e-mail, URL link to a web page, or other communication to forward to the policyholder descriptions of suggested adjustments to the policy (including any associated changes in premium) for a policyholder or customer to review.

The business logic computer 104 then updates inventory information stored in a data structure associated with the insured property to include information about the new device or asset recently added to the property at step 516.

In some instances, a recommended insurance adjustment includes an increase in policy premium due to increased insurance risks posed by the newly added device or asset (e.g., power tools or certain heavy machinery). Such an adjustment is binding. That is, a policyholder is not given the option to decline the adjusted policy if he/she wishes to continue to insure the property and its assets. In other instances, the business logic computer 104 determines that a policyholder may wish to adjust their coverage limits, either up or down. In those instances, a policyholder can choose to either accept or decline the recommended change in coverage limit.

Figure 6:
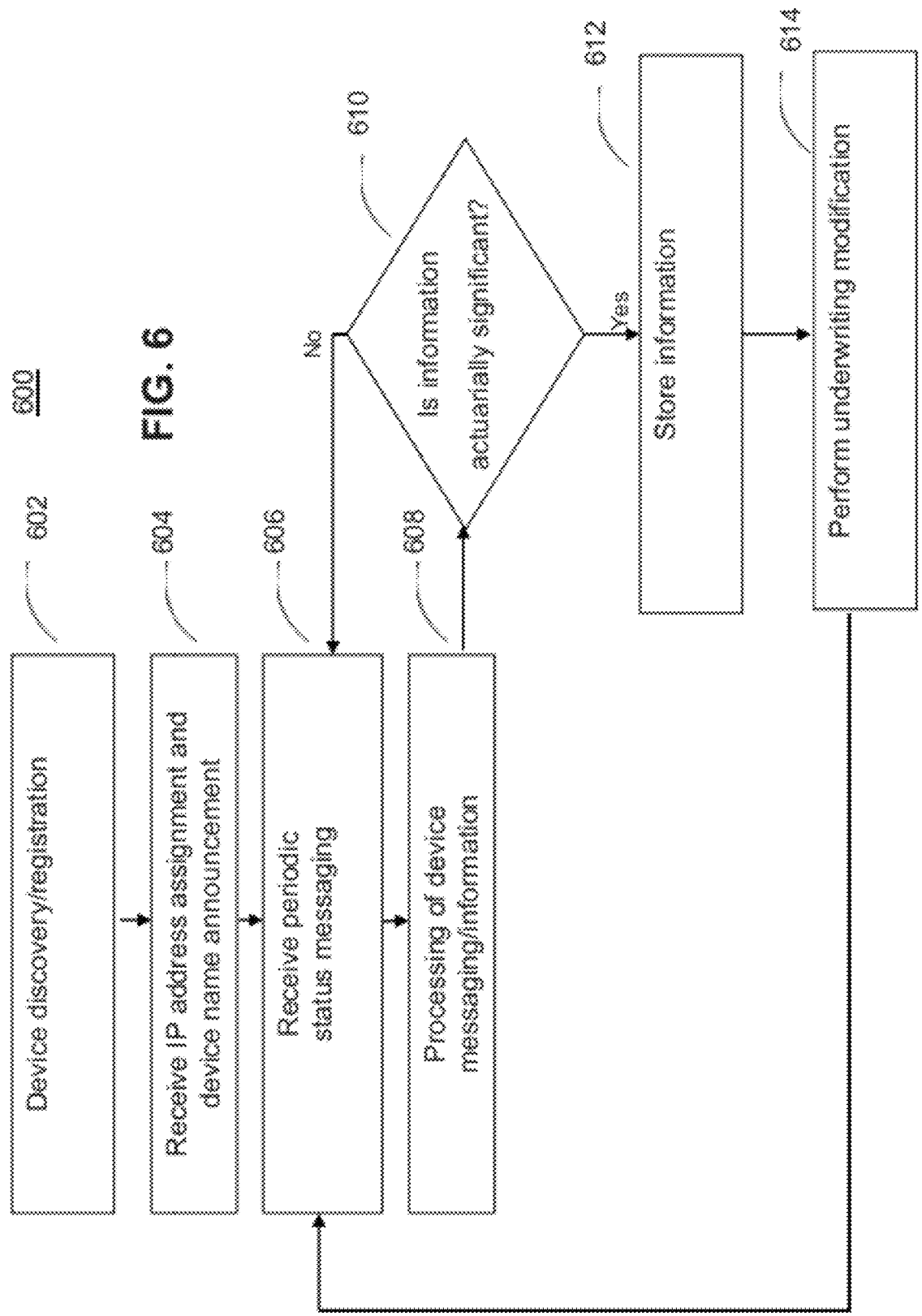
FIG. 6 is a flow chart of a method of determining an insurance underwriting modification based on device data, according to an illustrative embodiment of the invention.

FIG. 6 is a flow chart of a method 600 of determining an insurance underwriting modification based on device data, according to an illustrative embodiment of the invention. The method 600 begins at step 602 by receiving registration data from an IP-addressable device as described in relation to FIG. 5 above. At step 804, the insurance company system 102 receives an IP address and/or device name associated with the device. At step 806, the insurance company system 102 receives, via a base station of a local area network, periodic status messages generated by IP-addressable devices located at an insured property, such as the periodic message 406 depicted in FIG. 4. At step 808, the business logic computer 104 analyzes the device data received from a base station. The logic for carrying out such analysis may be stored in the business logic computer 104 or the database 108. Based on the received device data, the business logic computer 104, as described further in relation to FIG. 7, assigns each device or asset an actuarial class, or category, which is then used by the business logic computer 104 to determine an insurance policy adjustment.

After processing device data, the business logic computer 104 determines at step 610 whether information contained in the device data is actuarially significant. For example, if operational data received from a base station of a network of IP-addressable devices indicates that an insured property now houses particularly risky assets. Depending on the nature of assets, such as their associated environmental or other risks, the business logic computer 104 determines whether such a change increases the liability and/or risks associated with the property by a substantial amount. If so, the business logic computer 104 determines that such a change is actuarially significant. With regard to data associated with an individual IP-addressable device, certain changes in its operation data may also be actuarially significant. The database 108 may store a range of operational data that is acceptable for each type of device. For example, the database 108 may store acceptable temperature ranges for heating or cooking equipment. The business logic computer 104 can compare a device's current operational data with the acceptable operational data range defined for the device so that if the current operational data exceeds the acceptable range, the business logic computer 104 determines that the data is actuarially significant.

If the business logic computer 104 determines that the information indicated in operational data of a plurality of IP-addressable devices connected to a base station is not actuarially significant, the business logic computer 104 returns to step 606 for receiving additional operational data from the base station. If the business logic computer determines that the information indicated in the operational data is significant, the business logic computer 104 stores the received data in the database at step 612.

After storing actuarially significant data at step 612, the business logic computer 104 performs underwriting modification for modifying an existing insurance policy at step 614. The business logic computer 104 can determine an insurance policy adjustment by first determining an underwriting score for the property. Additional details of an underwriting process are described in relation to FIG. 7. Computer logic (e.g., in the form of computer readable instructions stored on a computer readable medium) for carrying out the underwriting modification process may be stored locally at the business logic computer 104 or in the database 108. The business logic computer 104 invokes the corresponding logic for determining an insurance adjustment and sends an adjustment notification for a policyholder to review.

FIG. 7 depicts a table of underwriting scores associated with categories to which a plurality of IP-addressable devices are assigned for determining an insurance policy premium, according to an illustrative embodiment of the invention. As mentioned above, the business logic computer 104 assigns each device to one of the categories depicted in FIG. 7 based on the device's registration and/or operational data. Based on the category to which a device is assigned, the business logic computer 104 assigns an underwriting score for the device or an asset that the device is used to monitor. The insurance company system 102 stores in the database 108 and/or its business logic computer 104 the appropriate applications, logic, or computer program for carrying out the analysis related to device categorization. Details of an underwriting system utilizing classifiers for categorizing and weighting risks is described in U.S. Pat. No. 7,711,584, the entirety of which is incorporated herein by reference.

As depicted in FIG. 7, categories to which IP-addressable devices may be assigned include, without limitation, Home Security and Fire, General Appliance or Device, Plumbing, Heating/Cooking, Recalled Appliances, and other. Based on registration data, which includes information about the name, make, and model number of a device, the business logic computer 104 determines a category for the device and/or an asset the device is used to monitor. For example, in the registration message output by the stove 206, the business logic computer 104 determines that the stove is a Heating/Cooking appliance. As another example, registration data of an IP-addressable water meter is indicative of the presence of both the water meter and a plumbing system. The business logic computer determines that the IP-addressable water meter should be assigned to the Plumbing system category.

Each of the depicted categories is associated with a different underwriting score or scoring algorithm. This is because different categories of devices pose different levels and types of risks that an insurance company must underwrite. For example, the Electrical Appliance/Device is given a higher underwriting score than the Heating/Cooking category because home appliances are generally known to pose greater risks than devices used in Heating/Cooking. A more risky category is associated with a higher underwriting score indicating a higher level of risk.

To determine an insurance policy adjustment, the business logic computer 104 may determine a total underwriting score according to several methods. In some embodiments, a total underwriting score is a sum of all underwriting scores associated with all IP-addressable devices or assets based on the categories that these devices are assigned to.

In other embodiments, each underwriting score associated with an IP-addressable device is given an additional offset or weighting factor determined by the business logic computer 104 based on the operational data of each IP-addressable device. Registration information of a device is only relevant for determining the kind of device it is. Each kind of device may be associated with certain known insurance risks, which the business computer 104 can determine based on the device's registration. However, those insurance risks are predicted or anticipated risks, pre-defined by an insurance company and/or a device manufacturer. The registration data is not indicative of actual insurance risks that may be posed by a device, which the business logic computer 104 can more accurately determine based on the device's operational data.

The business logic computer 104 can also use the operational data to determine risks arising from interaction between devices because certain devices are inter-dependent on one another for their operations and many devices also share certain resources with one another. In some instances, the operational data of inter-dependent devices may indicate certain insurance risks arising from the interactions of the devices. Particularly, operational data indicative of potential risks arising from device interaction may be determined via inter-device communication, details of which are described in relation to FIG. 8. For instance, the business logic computer 104 may determine that certain interdependent appliances at a property regularly experience a common electrical spike The data can be used to further fine tune underwriting analyses carried out by the business logic computer 104.

In some embodiments, because a total underwriting score of an insured property may change due to changes in operational data received from the property's IP addressable devices, the business logic computer 104 can actively adjust an underwriting score associated with a property periodically or in response to an actuarially significant change detected in the operational data. Based on the adjusted underwriting score, the business logic computer 104 can determine a policy adjustment according to the underwriting logic stored in the business logic computer 104 and/or in the database 108.

Figure 8:
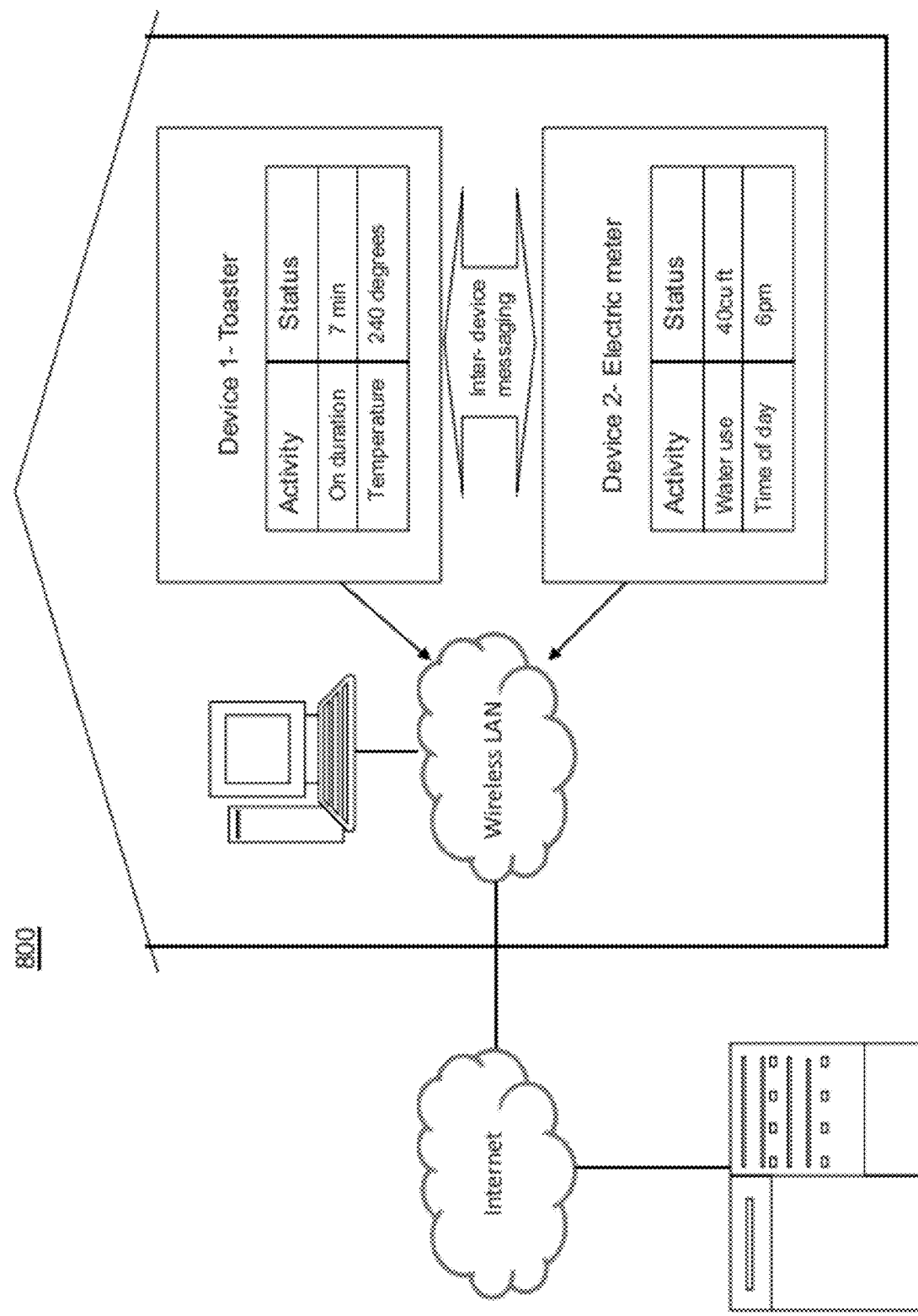
FIG. 8 is a diagram depicting inter-device communication for the purpose of determining and mitigating potential insurance risks associated with the devices, as determined by the insurance company system of FIG. 1.

FIG. 8 is a diagram 800 depicting inter-device communication for the purpose of determining and mitigating potential insurance risks associated with the devices as determined by the insurance company system of FIG. 1. The illustrative IP-addressable devices as depicted in the diagram 800 include the toaster 208 and the electric meter 212 connected to the base station 202, which is a wireless LAN in this illustrative embodiment. Also connected to the wireless LAN is the computer 406 for storing device data, such as registration and/or operational messages generated and outputted by the toaster 308 and water meter 312. A policyholder can also view stored device data using the computer 406. As mentioned above in relation to FIG. 7, operational data of devices inter-dependent on one another and/or are sharing certain resources can be used by the business logic computer 104 to determine a more holistic risk profile for the devices. Inter-device communication allows devices to include, in their respective operational message, information about their interactions with other devices, which may be used by the business logic computer 104 to determine any potential risk that may arise from their interactions.

The insurance company system 102 can use the inter-device communication capability offered by the IP-addressable devices to mitigate potential insurance losses associated with the devices as determined by the insurance company system 102. For example, the business logic computer 104 may determine that for devices that are sharing certain resources, resource overload may occur, e.g., by overloading an electric circuit, which is an insurance risk. To prevent resource overload, each device can communicate with other devices competing for the same resource to self-adjust its resource consumption based on consumption information collected about other devices. In other embodiments, a centralized control device, such as a meter or a power control for controlling electrical loads of various appliances or devices found in a home or office, can intercept inter-device communications to provide real-time resource allocation, to track consumption patterns, and to communicate to the insurance company system 102 the state of the resource.

In some implementations, the two networked IP-addressable devices depicted in the diagram 800 may interact with one another and/or any other devices connected to the wireless LAN to perform IP addressing, device discovery, device description, action invocation or control, event messaging, and presentation. When a device first connects to the wireless LAN, or base station 202, the device advertises itself to the network and/or other devices, including control points, connected to the network. Once a device is discovered by the control points and/or other networked devices, a description of the device and the services it provides is presented in a message in XML to the base station 202. The base station 202 communicates the advertised message to the insurance company system 102 for registering the device with the system 102.

Figure 9:
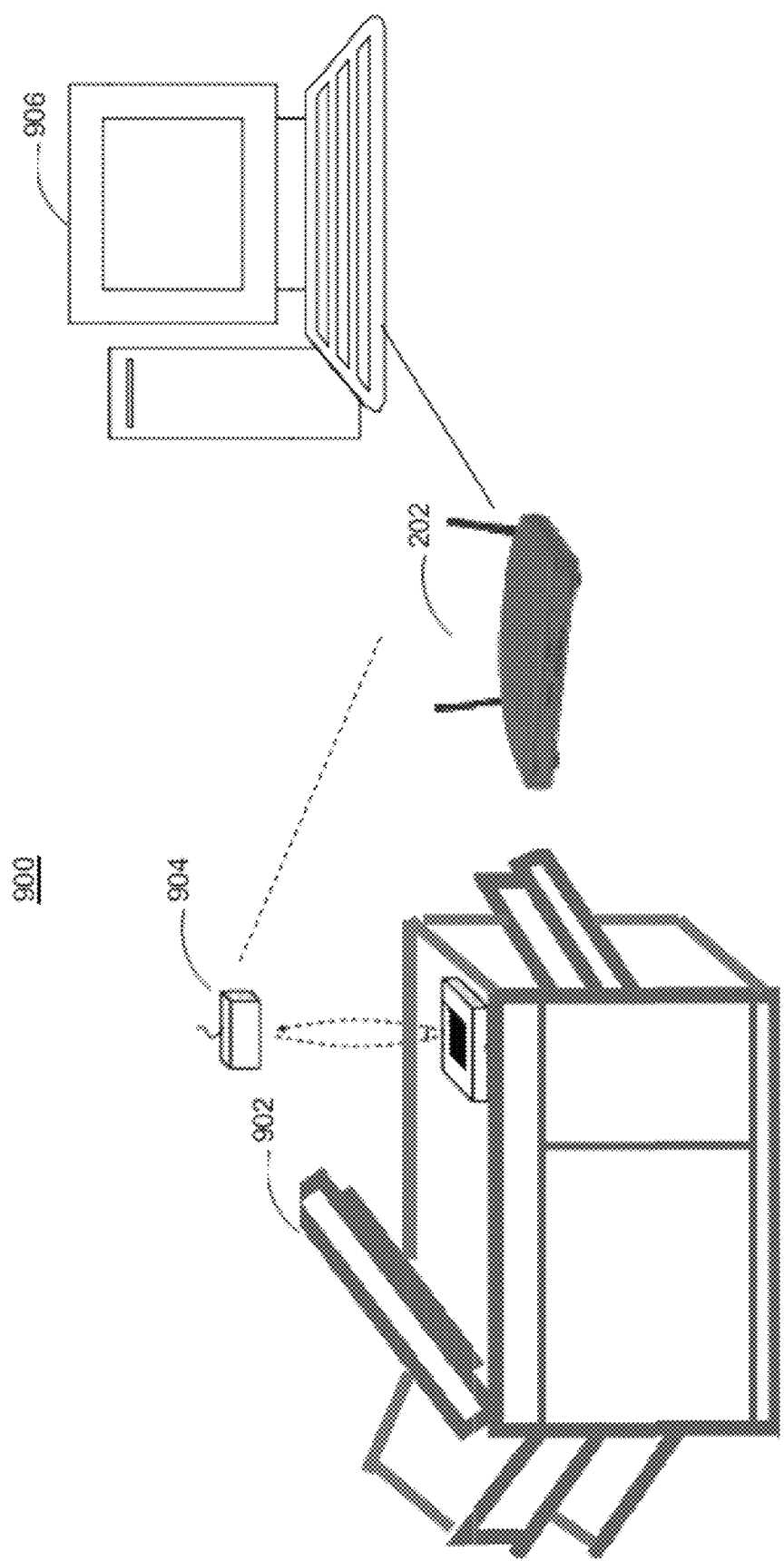
FIG. 9 depicts an illustrative addressable device with its addressing capability enabled by an RFID tag for communicating its device data to the insurance company system of FIG. 1.

FIG. 9 depicts an illustrative addressable device with its addressing capability enabled by an RFID tag for communicating its device data to an insurance company system 102 of FIG. 1. As discussed in relation to FIG. 2, technologies related to RFID can be used to enable the addressing capability of devices or assets located at an insured property that otherwise lack network connectivity. The following discussions describe various technical implementations related to the use of RFID technologies for allowing RFID enabled devices to communicate their device data to the insurance company system 102 for active underwriting, thereby expanding the ability of the insurance company to maintain an accurate inventory of assets on the property and expanding the ability to provide accurate underwriting analyses.

In one embodiment, the RFID tag 904 is an active Wi-Fi enabled RFID tag with 802.11 Wi-Fi capabilities, capable of communicating with location-aware wireless access points, such as the base station 202. Other types of active RFID tags suitable for the present invention include the Extended Capabilities RFID tags offered by Intelleflex Corporation. In another embodiment, the RFID tag is a passive RFID tag. A passive RFID tag reader can detect the presence of the passive RFID tag and any structure, component, or device attached thereto, such as the photocopier machine 902.

In some embodiments, passive RFID tags, such as the tag 904, are used to keep track of an inventory of assets located at an insured property. A policyholder responsible for the property insured under an insurance policy can attach such a passive tag to any or assets that he/she wishes to cover under the policy. In some instances, to receive certain insurance premium discounts, policyholders are required to tag assets located at an insured property. A policyholder can use a passive RFID reader to scan every tagged device to provide inventory information about the tagged assets to the insurance company system 102. The RFID reader can communicate tag information to a local base station from which the insurance company system 102 can receive inventory information about each tagged device located at an insured property. Alternatively, a policyholder can connect the RFID reader to a computer for uploading tag information stored in the reader to an insurance company's web server for updating inventory information about his/her insured property.

In other embodiments, the RFID tag 904 is an active RFID tag 904 consisting of both location tracking, sensor telemetry, and Wi-Fi capabilities. With its Wi-Fi capability, the RFID tag 904 is IP-addressable and can communicate with the local area network base station 202. A DHCP server, such as the base station 202, may assign each RFID enabled IP-addressable device, during discovery, its unique IP address either directly and/or through a RFID tag reader, depending on the specific design choice.

An active Wi-Fi enabled RFID tag 904 includes sensor elements for obtaining sensor data about its surrounding, in addition to obtaining data about the device itself. The tag 904 can further include a control module for controlling the device the tag is attached to, such as the photocopier machine 902 in this illustrative embodiment (e.g., to power it down to reduce power consumption). To do so, the active Wi-Fi enabled RFID tag 904 includes an antenna for receiving commands from a base station configured to communicate with RFID tags using radio waves. An active Wi-Fi enabled RFID tag 904 may include logic and memory necessary to store and/or process sensor data acquired from its sensor elements. In addition to obtaining and transmitting device data about the operation and state of the photocopier machine 902, the tag is also capable of detecting, through its sensor elements, environmental conditions surrounding the machine 902.

Devices with an active Wi-Fi enabled RFID tag may connect to a network having other IP-addressable devices enabled by other types of technologies, such as UPnP and/or Bluetooth. That is, certain Wi-Fi enabled RFID IP-addressable devices may be used collaboratively with other kinds of IP-addressable devices, such as an UPnP enabled IP-addressable device with appropriate network configuration. An exemplary description of such network configuration that enables the use of Wi-Fi enabled RFID tags for receiving and transmitting telemetry data wirelessly to a local area network is provided in Cisco's Compatible Extensions for Wi-Fi Tags specification. With the appropriate network configuration, each IP-addressable device, RFID enabled or otherwise, can advertise itself during discovery to other devices connected to a network for inter-device communication and communication with the base station 202.

The invention may be embodied in other specific forms without departing from the spirit or essential characteristics thereof. Particularly, as mentioned above, various other technologies, in addition to UPnP and RFID, can be used to provide IP-addressing capability to electronic devices so that these devices can provide their device data to an insurance company's network using various network protocols. Therefore, the foregoing embodiments are to be considered in all respects illustrative, rather than limiting of the invention.

What is claimed is:

1. A system for utilizing IP-addressable devices for maintaining an inventory of assets located at a residential or commercial property covered under an insurance policy, comprising:
    an inventory database configured to store inventory information about assets located at an insured property;
    a communication interface configured to communicate with networks of IP-addressable devices for receiving registration and operational data associated with an IP-addressable device connected to each of the networks; and
    a business logic computer in communication with the database and the communication interface, configured to
        create in the inventory database, for each insured property having IP-addressable devices, a data structure for storing inventory information about assets located at the insured property;
        determine, for the insured property, the inventory information about the insured property's assets based on registration and operational data received from the IP-addressable devices located at the insured property, and
        store the insured property's inventory information in its data structure in the inventory database.

2. The system of claim 1, wherein the assets include at least one of physical asset including an IP-addressable device, and electronic data stored in the assets.

3. The system of claim 1, wherein the registration and operational data received from the IP addressable devices indicates presence of the assets located at the insured property.

4. The system of claim 1, wherein the business logic computer is further configured to detect addition of an asset to and removal of an asset from the insured property based on registration and operational data received from the IP-addressable devices located at the insured property, and to update the inventory information stored in the inventory database in response to the detection.

5. The system of claim 1, wherein the operational data of the IP-addressable devices indicates at least one of operational status, condition, and use of one of the assets located at the insured property.

6. The system of claim 1, wherein the business logic computer is further configured to determine insurance risks associated with the assets located at the insured property based at least in part on the registration and operational data of at least one of the IP-addressable devices.

7. The system of claim 1, wherein the business logic computer is further configured to determine an insurance policy adjustment comprising one of a change in coverage limit and premium based at least in part on the registration and operational data of the insured property's IP addressable devices.

8. The system of claim 1, wherein the business logic computer is further configured to categorize the insured property's assets into one of a plurality of actuarial classes defined by an insurance company based on registration and operational data received from the insured property's IP addressable devices.

9. The system of claim 8, wherein the business logic computer is further configured to assign an underwriting score for each of the assets based on its associated actuarial class and to determine an aggregate underwriting score for the insured property based at least in part on the assigned underwriting score of each asset.

10. The system of claim 9, wherein the business logic computer is further configured to determine an insurance policy adjustment for the insured property based at least in part on the aggregate underwriting score associated with the insured property.

11. A computerized method for utilizing IP-addressable devices for maintaining an inventory of assets located at a residential or commercial property covered under an insurance policy, comprising:
storing, by an inventory database, inventory information about assets located at an insured property;
receiving, by a communication interface for communicating with networks of IP-addressable devices, registration and operational data associated with an IP-addressable device connected to each of the networks;
creating a data structure in the inventory database for each insured property having IP-addressable devices, by a computer, for storing inventory information about assets located at the insured property;
determining, by the computer, for the insured property, the inventory information about
the insured property's assets based on registration and operational data received from the IP-addressable devices located at the insured property; and
storing, by the computer, in the data structure in the inventory database the insured property's inventory information.

12. The computerized method of claim 11, wherein the assets include at least one of physical asset including an IP-addressable device, and electronic data stored in the assets.

13. The computerized method of claim 11, wherein the registration and operational data received from the IP addressable devices indicates presence of the assets located at the insured property.

14. The computerized method of claim 11, further comprising detecting by the computer that an asset is added to or removed from the insured property based on registration and operational data received from the IP-addressable devices located at the insured property, and updating by the computer the inventory information stored in the inventory database in response to the detection.

15. The computerized method of claim 11, wherein the operational data of the IP-addressable devices indicates at least one of operational status, condition, and use of one of the assets located at the insured property.

16. The computerized method of claim 11, further comprising determining, by the computer, insurance risks associated with the assets located at the insured property based at least in part on the registration and operational data of at least one of the IP-addressable devices.

17. The computerized method of claim 11, further comprising determining, by the computer, an insurance policy adjustment comprising one of a change in coverage limit and premium based at least in part on the registration and operational data of the insured property's IP addressable devices.

18. The computerized method of claim 11, further comprising, categorizing by the computer the insured property's assets into one of a plurality of actuarial classes defined by an insurance company based on registration and operational data received from the insured property's IP addressable devices.

19. The computerized method of claim 18, further comprising assigning, by the computer, an underwriting score for each of the assets based on its associated actuarial class and determining, by the computer, an aggregate underwriting score for the insured property based at least in part on the assigned underwriting score of each asset.

20. The computerized method of claim 19, further comprising determining by the computer, an insurance policy adjustment for the insured property based at least in part on the aggregate underwriting score associated with the insured property.

21. A non-transitory computer readable medium storing computer executable instructions, which, when executed by a processor, cause the processor to carry out a method, the method comprising:
storing in an inventory database inventory information about assets located at an insured property;
receiving registration and operational data associated with an IP-addressable device;
creating a data structure in the inventory database for each insured property having IP-addressable devices for storing inventory information about assets located at the insured property;
determining for the insured property the inventory information about the insured property's assets based on registration and operational data received from the IP-addressable devices located at the insured property; and
storing in the data structure in the inventory database the insured property's inventory information.

22. The non-transitory computer readable medium of claim 21, wherein the assets include at least one of physical asset including an IP-addressable device, and electronic data stored in the assets.

23. The non-transitory computer readable medium of claim 21, wherein the registration and operational data received from the IP addressable devices indicates presence of the assets located at the insured property.

24. The non-transitory computer readable medium of claim 21, wherein the non-transitory computer readable medium further stores instructions for causing the processor to detect addition of an asset to and removal of an asset from the insured property based on registration and operational data received from the IP-addressable devices located at the insured property, and to update the inventory information stored in the inventory database in response to the detection.

25. The non-transitory computer readable medium of claim 21, wherein the operational data of the IP-addressable devices indicates at least one of operational status, condition, and use of one of the assets located at the insured property.

26. The non-transitory computer readable medium of claim 21, wherein the non-transitory computer readable medium further stores instructions for causing the processor to determine insurance risks associated with the assets located at the insured property based at least in part on the registration and operational data of at least one of the IP-addressable devices.

27. The non-transitory computer readable medium of claim 21, wherein the non-transitory computer readable medium further stores instructions for causing the processor to determine an insurance policy adjustment comprising one of a change in coverage limit and premium based at least in part on the registration and operational data of the insured property's IP addressable devices.

28. The non-transitory computer readable medium of claim 21, wherein the non-transitory computer readable medium further stores instructions for causing the processor to categorize the insured property's assets into one of a plurality of actuarial classes defined by an insurance company based on registration and operational data received from the insured property's IP addressable devices.

29. The non-transitory computer readable medium of claim 28, wherein the non-transitory computer readable medium further stores instructions for causing the processor to assign an underwriting score for each of the assets based on its associated actuarial class and determine an aggregate underwriting score for the insured property based at least in part on the assigned underwriting score of each asset.

30. The non-transitory computer readable medium of claim 29, wherein the non-transitory computer readable medium further stores instructions for causing the processor to determine an insurance policy adjustment for the insured property based at least in part on the aggregate underwriting score associated with the insured property.

* * * * *